June 6, 1939. R. A. ROWLEY 2,161,592
MULTIPLYING MACHINE
Filed Aug. 13, 1935   5 Sheets-Sheet 3

FIG.1c.

INVENTOR
Russell A. Rowley
BY
ATTORNEY

June 6, 1939.  R. A. ROWLEY  2,161,592
MULTIPLYING MACHINE
Filed Aug. 13, 1935   5 Sheets-Sheet 4

FIG. 4.

Patented June 6, 1939

2,161,592

UNITED STATES PATENT OFFICE 2,161,592

MULTIPLYING MACHINE

Russell A. Rowley, Endicott, N. Y., assignor to International Business Machines Corporation, New York, N. Y., a corporation of New York Application August 13, 1935, Serial No. 35,905

3 Claims. (Cl. 235—61.8)

This invention relates to multiplying machines and more particularly to machines of the record controlled type.

The principal object resides in the provision of a machine in which the separate products derived as the result of multiplying factors on each of a plurality of cards of a group are progressively accumulated and the sum of such products subtracted from an amount on one of said cards and the result entered on said one of the cards.

The operation may be expressed by the formula $A-\Sigma(B\times C)=D$, the new balance.

A further object resides in the provision of means for effecting a special designating perforation in cards which receive the new balance.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

Before explaining the manner in which the machine operates in the performance of its special functions, a brief explanation will be given of the manner in which the apparatus operates in performing simple multiplying operations.

The mechanical structure of the machine is substantially the same as that of Patent No. 1,933,714, granted November 7, 1933 to J. M. Cunningham, and in Patent No. 1,944,665, granted January 23, 1934, to D. J. Oldenboom.

After record cards bearing perforations representative of the factors to be multiplied have been placed in the feed magazine of the machine and after the various preliminary plug connections have been made for directing the entries into the accumulators, the main line switch SW (Fig. 1c) is closed, which places the motor M in operation. The motor M drives the A. C.-D. C. generator, indicated at AC and DC, Figs. 1a and 1c, respectively. The D. C. portion of the generator supplies current to D. C. lines 10 and 11 (Fig. 1c) and the A. C. commutator supplies current to ground and to a line 12. The start key contacts 13 (Fig. 1c) are now closed by depression of the start key button, which completes a circuit from the D. C. line 10, through a relay coil C, contacts 13 (now closed), upper contacts G1, cam contacts FC2, to line 11. The coil C establishes a holding circuit through its contacts C2 and cam contacts FC8.

Figure 1A:
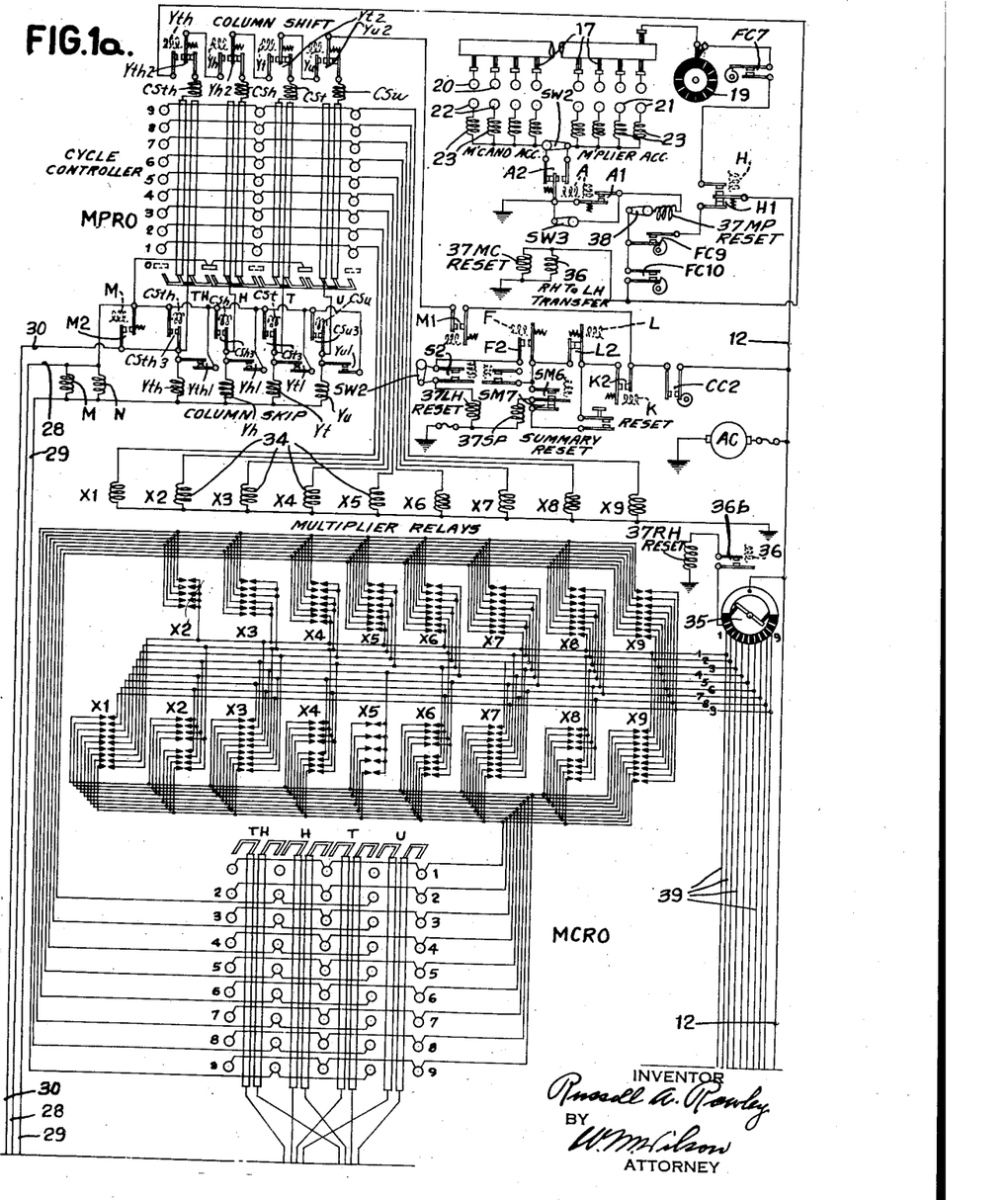
Figs. 1a, 1b, and 1c, taken together and placed one above the other in the order named, constitute a wiring diagram of the electric circuits of the machine.

The coil C, when energized, also closes a pair of contacts C1, which will complete a circuit from line 10, normally closed relay contacts F1, card feed clutch magnet 14, cam contacts FC6, stop key contacts 15, relay contacts N1, contacts C1, a pair of contacts P1, to line 11. Energization of card feed clutch magnet 14 will cause withdrawal of a card from the magazine and will advance the card to the analyzing brushes 17 (Fig. 1a). During this movement of the card, the usual card lever is engaged to close card lever contacts 18 (Fig. 1c), which complete a circuit from line 11, contacts 18, relay magnet H, to line 10.

In starting up the machine, it is necessary to hold down the start key to maintain the contacts 13 closed during the first complete card feeding cycle, or alternatively, to depress the start key a second time. At the beginning of the second card cycle, the closure of cam contacts FC11 will energize relay magnet G through a circuit including card lever contacts 18. Relay magnet G will close its normally open contacts G1, setting up a holding circuit through cam contacts FC2 and will also close relay contacts G2 to provide a further holding circuit through the card lever contacts 18. These two holding circuits alternate in maintaining the relay magnet G energized as long as cards continue to feed from the magazine. The relay magnet H is also provided with a holding circuit which extends through card lever contacts 18 or serially through relay contacts G2 and cam contacts FC2.

Energization of relay magnet H will cause shifting of its contacts H1 (Fig. 1a) to the reverse of the position shown, thereby supplying current to the impulse distributor 19 which supplies current to the analyzing brushes 17 and as the card proceeds to pass the analyzing brushes, circuits will be completed to the accumulators selected to receive entries in accordance with the perforations in the record card; that is, as the card traverses the brushes 17, the multiplier factor will be entered into the multiplier accumulator and the multiplicand factor will be entered into the multiplicand accumulator. The entering circuits extend from the A. C. generator, through line 12, to the now closed contacts H1, cam contacts FC7, distributor 19, brush contact roll between which and the brushes 17 the card passes.

From the contact roll the circuits extend through the perforations in the card, the brushes 17, to plug sockets 20, from which suitable plug connections are made to sockets 21 and sockets 22 of the multiplier and multiplicand accumulators, respectively, to effect energization of the adding magnets 23 of the related accumulators. The entering circuit, after passing through the magnets 23, continues through normally closed contacts A2 to ground.

After the first card has traversed the brushes 17 it is fed into the punching unit of the machine and upon its arrival there, it causes closure of punch card lever contacts 24 (Fig. 1c) which cause energization of the relay magnet F. The closure of the normally open contacts F1 establishes a circuit from line 10, now closed contacts F1, cam contacts CC3, trip magnet 25 of the punching unit which functions to trip clutch mechanism to further advance the card to punching position. The circuit continues through eject contacts P3 and relay contacts K1, which at this time are in the position reverse to that shown. The contacts K1 are controlled by relay magnet K which is energized through last column contacts P2 in the punching unit. These so-called last column contacts close whenever the card advancing carriage of the punching unit is in last column punching position, which position it occupies when the operation of the entire machine is first started so that upon starting, relay K is energized and its contacts K1 are in shifted position.

Relay F also closes a pair of contacts F2 (Fig. 1a) which complete a circuit from line 12, cam contacts CC2, contacts K2, L2, F2, switch SW2, reset magnet 37LH to ground.

Energization of magnet 37LH causes resetting of the LH accumulator which receives the left hand components of the product and the purpose of resetting it at this time is to prepare for multiplication of the factors on the first card. As this accumulator is reset, contacts 44 (Fig. 1c) close, establishing a circuit from line 11, lower contacts 43, upper contacts 44, switch SW1, relay magnet L to line 10. Relay magnet L closes its contacts L1 to provide a holding circuit through the usual punch feed rack contacts 60 which is maintained until the next card is fed from the feed hopper of the punching unit and contacts 60 opened. These contacts correspond to contact 161a of the Cunningham patent. Relay magnet L also opens its contacts L2 (Fig. 1a) this preventing further resetting of the LH accumulator for such period.

The cards are handled in the card punching unit in the customary manner as set forth in the above mentioned patents. After the analyzed card has been advanced column by column in the punching unit and the left hand component accumulator LH is being reset, a circuit is completed which extends from line 11 (Fig. 1c), contacts 44 and 79 which are closed while the LH accumulator is resetting, normally closed relay contacts SM2, wire 28 (Figs. 1b and 1a), through relay magnets M and N in parallel, wire 29 (Figs. 1b and 1c), to line 10. Relay magnet M closes its contacts M2 (Fig. 1a) to provide a holding circuit for the relays extending from line 10, wire 29, relays M and N, contacts M2, wire 30, to the normally closed contacts 31 (Fig. 1c) and line 11. Contacts 31 are opened during the operation wherein the MC accumulator is reset and until such time, relay magnets M and N will remain energized. These are the master relay magnets of the cycle controller unit and they call the cycle controller into operation to determine the location of significant figures in the multiplier.

The circuit through wire 28 also extends to the zero segments of the readout unit of the multiplier accumulator designated MPRO. If any of the brushes of the MPRO stand at zero, selected ones of the column skip magnets Yu, Yt, Yh, etc., will be energized according to which denominational orders of the multiplier contain zeros. The magnets Yu, Yt, Yh, etc., control contacts Yu—2, Yt—2, Yh—2, etc., through which circuits are completed to the column shift relay magnets CSu, CSt, CSh, etc., and to the multiplying relay magnets 34. In those positions in which the multiplier digit is zero, the associated magnet Yu, Yt, Yh, etc., will be energized and the related contacts Yu—2, Yt—2, Yh—2, etc., will be shifted from the position shown in the diagram so that the related magnet CSu, CSt, CSh, etc., will be disconnected from the circuit which is traceable from line 12, cam contacts CC2, relay contacts M1, normally closed contacts Yu—2, Yt—2, Yh—2, etc., relay magnet CSu, CSt, CSh, etc., through the appropriate readout spot in one order of the readout section MPRO, to the corresponding relay magnet 34, and thence to ground. The function of the contacts Yu—2, Yt—2, Yh—2, etc., is to direct the multiplying relay selecting circuits through only those positions in which significant figures occur in the multiplier and to skip the positions in which zeros occur. The usual holding contacts Yu—1, Yt—1, Yh—1, etc., are provided to maintain their related magnets Yu, Yt, Yh, etc., energized. With a particular magnet 34 energized, for example the X5 magnet 34, the related contacts shown in the center of Fig. 1a will become closed and with the emitter 35 in constant operation, impulses will be emitted through the contacts of the times 5 multiplier relay 34 and thence through the readout device of the multiplicant accumulator designated MCRO and thereafter through the column shift relay contacts CSL and CSR (Fig. 1b) to the adding magnets 23 of the RH and LHA accumulators which thus receive the right and left hand partial product entries.

The CSL and CSR relay contacts are controlled by the relay magnets CSa, CSt, CSh, etc., and serve to effect the proper denominational allocation of the partial product entries. Thus, when multiplying is being effected by the units digit of the multiplier, the units magnet CSu is energized and the units order set of contacts CSL and CSR are closed.

Energization of a relay magnet CSu, CSt, CSh, etc., (Fig. 1a) will also close a pair of contacts CSu3, CSt3, CSh3, etc., which will cause energization of the relay magnet Yu, Yt, Yh, etc., in the order in which multiplying is taking place. This in turn will shift the related pair of contacts Yu2, Yt2, Yh2, etc., so that when cam contacts CC2 again close, the aforetraced circuit will be directed through the magnet CSu, CSt, CSh, etc., in the order containing the next higher significant figure and will skip the magnets CS in positions in which zeros are present.

The machine continues multiplying operations during which the partial products are entered in succession into the LH and RH accumulators. After a multiplying cycle has been effected for each significant multiplier digit, all of the magnets Y*u*, Y*t*, Y*h*, etc., will have been energized and all of the contacts Y*u*2, Y*t*2, Y*h*2, etc., will be in their shifted positions so that on the next following cycle the closure of cam contacts CC2 will complete the circuit which extends through all of the now closed contacts Y*u*2, Y*t*2, Y*h*2, etc., to the relay magnet 36 and the multiplicand reset magnet 37MC. A parallel circuit also extends through cam contacts FC10 and multiplier reset magnet 37MP. If switch 38 is open, the multiplier accumulator will not be reset and the factor therein will become a so-called "fixed" multiplier for succeeding multiplying operations.

The relay magnet 36 closes its contacts 36*a* (Fig. 1*b*) which connect the readout section of the RH accumulator, designated RHRO, to the adding magnets 23 of the LH accumulator, thus transferring the sum of the right hand partial products into the LH accumulator to produce the complete product. These circuits are controlled from the emitter 35 through a group of wires generally designated 39 which extend to the readout device RHRO.

Figure 2:
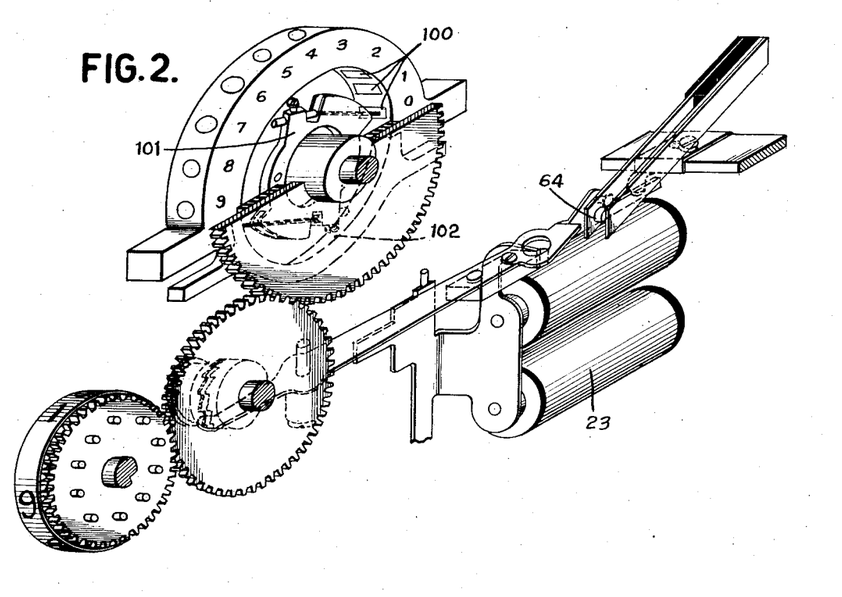
Fig. 2 is a detail in isometric of an order of one of the accumulators.

In Fig. 2 is shown a section of an accumulator to illustrate the mechanical arrangement of the readout section which is the same for all the accumulators except in the number of commutator segments provided. For each order there are commutator segments 100 which are electrically connected through the brush structure 101 to the common arcuate conducting strip 102. The position of the brush corresponds to the value entered on its associated accumulator and connects the segment 100 having such value to strip 102. In the circuit diagram, the segments and strips are represented as circles and vertical bars respectively.

During the cycle in which the MC accumulator is reset concurrently with the RH to LH transfer operation, the normally closed contacts 31 (Fig. 1*c*) which are operated by a cam on the MC reset shaft will open to interrupt the circuit to the cycle controlling relay magnets Y*u*, Y*t*, Y*h*, etc., thus causing deenergization of all these magnets and the interruption of their related circuits.

Closure of the lower contacts 31 during the resetting of the MC accumulator will complete a circuit from line 11, lower contacts 31, relay D to line 10, and relay D will in turn close its contacts D2 to provide a holding circuit through contacts CC1. A further pair of contacts D1 (Fig. 1*b*) are closed to effect transferring of the product now standing in the LH accumulator to the summary products accumulator. This transfer is brought about through circuits which extend from line 12, contacts D1, closed contacts SM8, emitter 61, readout section LHRO of the LH accumulator, plug connection 62, closed contacts CA1, magnets 23 of the SP accumulator, to ground.

The RH to LH transfer relay magnet 36 closes a pair of contacts 36*b* (Fig. 1*a*) through which a circuit is completed by the emitter after the amount in the RH accumulator has been transferred to the LH accumulator. This circuit is traceable from line 12 through emitter 35, which, when the brushes are at the zero segment, will continue through contacts 36*b* to the reset magnet 37RH which functions to initiate resetting of this accumulator.

Figure 1B:
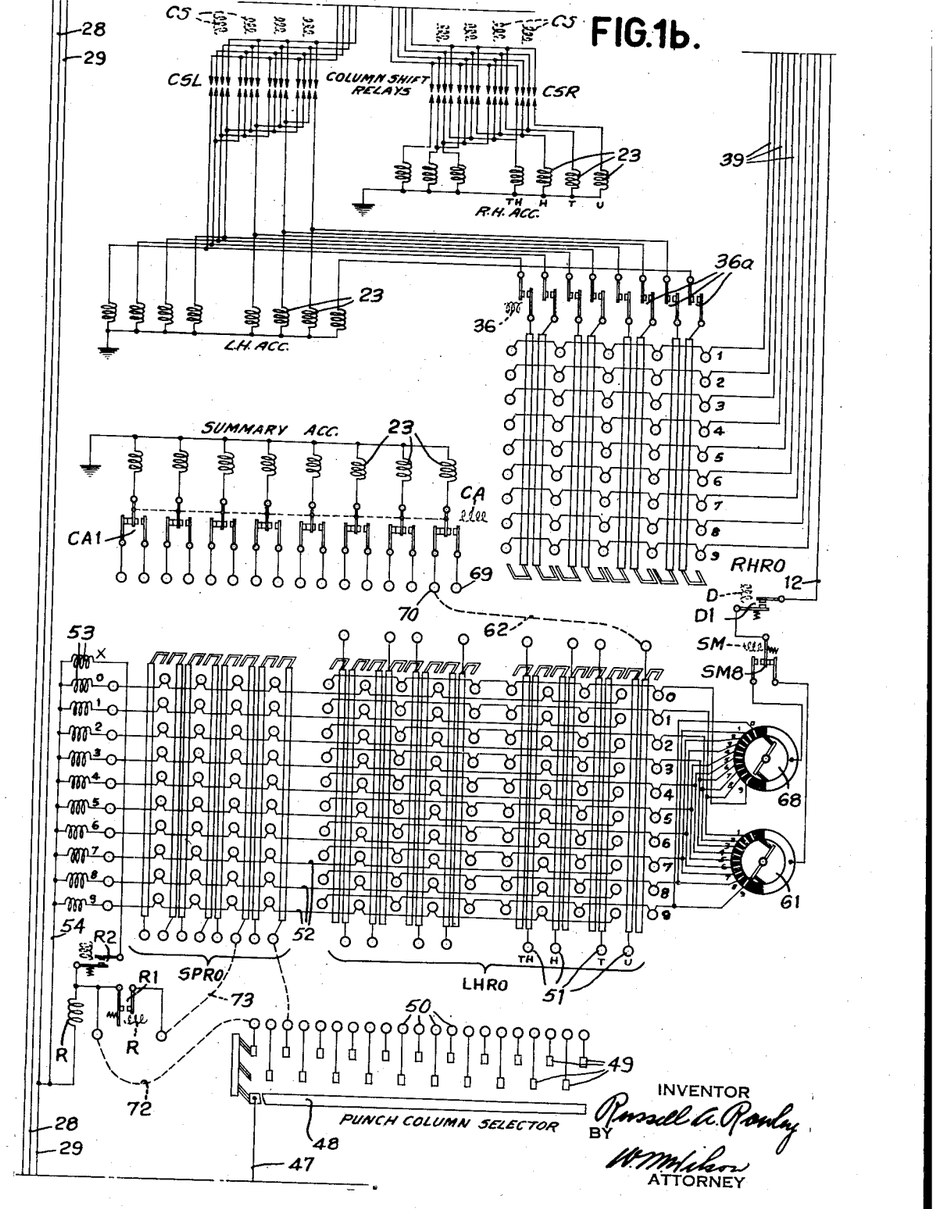
Figure 1C:
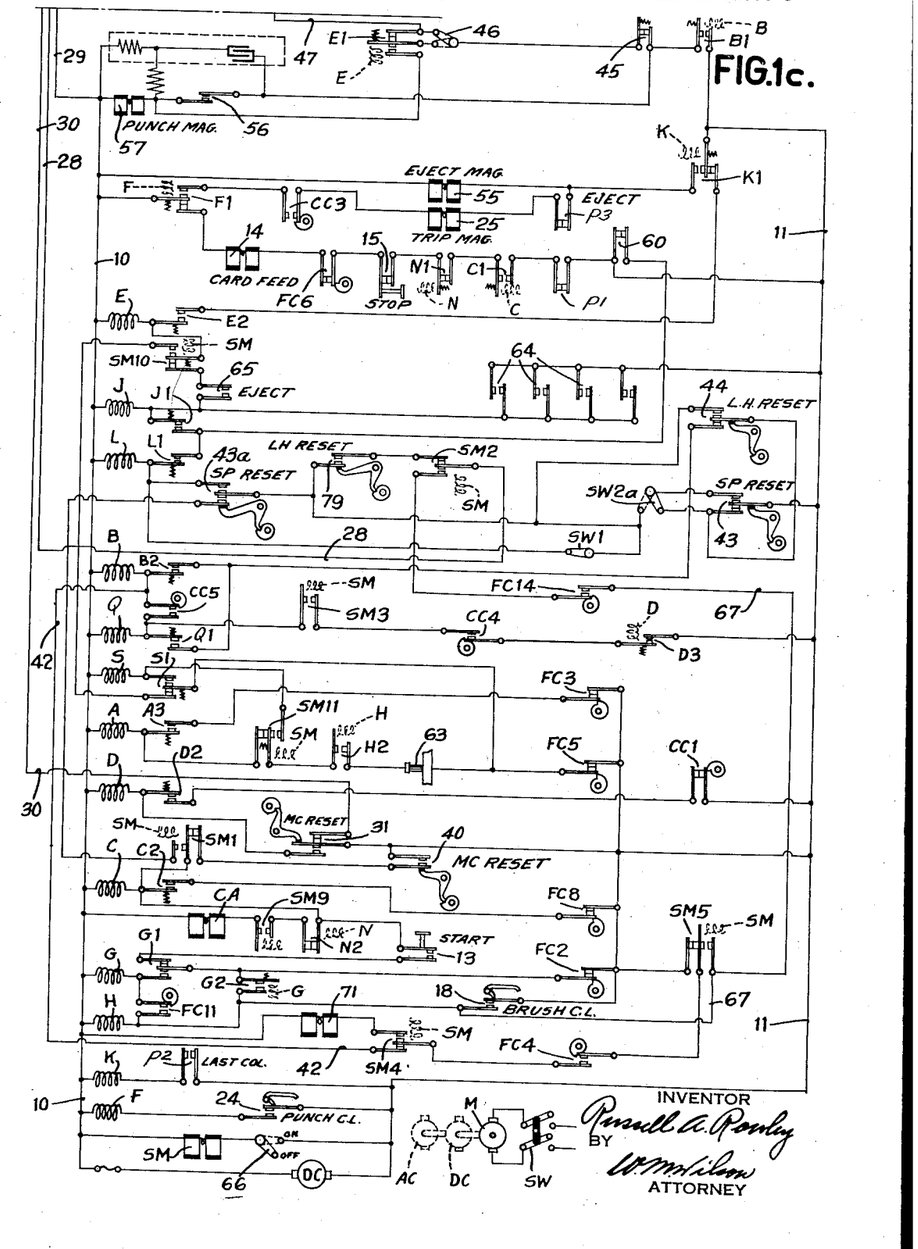

Referring now to Fig. 1*c*, the contacts 40 are closed along with the shifting of contacts 31 when the MC accumulator is resetting, thereby completing a circuit from line 11, contacts 40, normally closed contacts SM1, relay magnet C, to line 10. Relay magnet C establishes a holding circuit through contacts C2 as before and also closes contacts C1 to complete the circuit through the card feed clutch magnet 14 as traced above. This causes the next card to be fed to the analyzing brushes where the new factors will be entered into the accumulators and in the case of fixed multiplier operation, wherein the multiplier accumulator is not reset, only a multiplicand factor will be entered into the MC accumulator in preparation for the next series of multiplying operations.

During the operation of card feeding, the cam contacts FC4 close, completing a circuit from line 11, normally closed contacts SM5, contacts FC4, normally closed contacts SM4, thence through a wire 42 to relay B and to line 10. Energization of magnet B will close its contacts B2 to provide a holding circuit through normally closed contacts 44 and 43 associated with the reset devices of the LH and SP accumulators, respectively. The magnet B will also close its contacts B1, thereby establishing a circuit from line 11, contacts B1, contacts 45 in the punching unit, switch 46, wire 47 (see Fig. 1*b*) to the common conducting strip 48 of the punch column selector. The strip 48 is connected in succession to the segments 49 as the record card moves step by step past the column of punches in the punching unit and in those columns which are plug connected to the readout device LHRO will complete circuits from segments 49 to sockets 50, thence through plug connections to sockets 51 and through the LHRO device to wires 52 which extend to the punch selecting magnets 53 whose common return wire 54 extends to line 10 through wire 29.

While the step by step punching of the product takes place in the card, the new factors are entered into their appropriate accumulators and when the card is completely punched and advanced to its last column position, relay K will be energized as before to close its normally open contacts K1 and complete a circuit through the eject magnet 55, which ejects the punched record from the machine.

As explained in the above mentioned patents, the energization of any of the magnets 53 will advance a related interposer into operative relationship with a corresponding punch and the advancement of any interposer will cause closure of a pair of contacts 56 (Fig. 1*c*) which complete a circuit from line 10, through the punch magnet 57, contacts 56 and B1, to line 11. The punch magnet serves to press the interposer against the selected punch to effect a perforation in the corresponding position in the card column. The feeding of the new card to the brushes will again cause closure of the card lever contacts 18, causing energization of magnet H to permit the impulse distributor 19 to supply current to the card analyzing brushes 17.

The operation of the machine as thus far described is substantially the manner in which multiplying operations are performed in the patents referred to and in commercial machines.

The operations as outlined relate to so-called "individual multiplication" wherein a pair of factors are read from each card and the product is punched back into the separate cards. At the same time the sum of the several products is accumulated in the SP accumulator.

This type of machine is also designed for what is known as "group multiplication" in which the multiplication of a multiplicand factor on each card is effected by a common multiplier factor carried by a so-called rate card. The changes in operation for this type of functioning will now be briefly reviewed.

When starting a run of group multiplication, the first rate card (bearing only the multiplier factor) is preceded by a blank card bearing only an "X" punching in a preselected column. The machine is started as above and the H relay energized to close its contacts H2 (Fig. 1c) so that when the brush 63 senses the "X" hole, a circuit will be completed from line 11, cam contacts FC5, brush 63, contacts H2, closed contacts SM11, relay A to line 10. Relay A closes its contacts A3 to provide a holding circuit through contacts FC3. Switch SW3 (Fig. 1a) is open for this operation and closure of contacts A1 will complete a circuit from line 12, contacts CC2, now closed contacts M1, normally open contacts Yu—2, Yt—2, Yh—2, etc., in series, contacts FC10, switch 38, magnet 37MP, contacts A1 to ground. This circuit will, of course, not be completed until all the Yu—2, Yt—2, etc., contacts have been closed as explained. The MP accumulator is accordingly cleared in readiness to receive the multiplier from the following rate card. Relay magnet A also closes a pair of contacts A2 which control the entry of the rate into the MP accumulator from the record card. Switch SW2 is open (Fig. 1a) and shifting of contacts A2 connects the adding magnets 23 of the multiplier accumulator to ground during the passage of the rate card by the analyzing brushes 17. Thereafter magnet A becomes deenergized and remains so until another "X" hole is sensed by brush 63.

As the multiplier factor is read into the MP accumulator, so-called list contacts 64 (Figs. 1c and 2) are closed in each order in which a significant entry is made.

Closure of any contact 64 will complete a circuit from line 11, contacts 64, relay magnet J to line 10, and a holding circuit will be established by contacts J1 through contacts 60. After the relay J is energized and when eject contacts 65 close upon completion of product punching, a circuit is completed from line 11, contacts 60, J1, 65, normally closed contacts SM10, relay E to line 10, which circuit is held through contacts K1 and E2. For this operation, switch 46 is in its dotted line position and the effect of energizing relay E is to prevent punching in the rate card and to cause its advance through the punching machine. Closure of lower contacts E1 will cause repeated energization of the punch magnet 57 to cause such advance, the circuit being traceable from line 11, contacts B1, 45, switch 46, lower contacts E1, magnet 57 to line 10.

Figure 3:
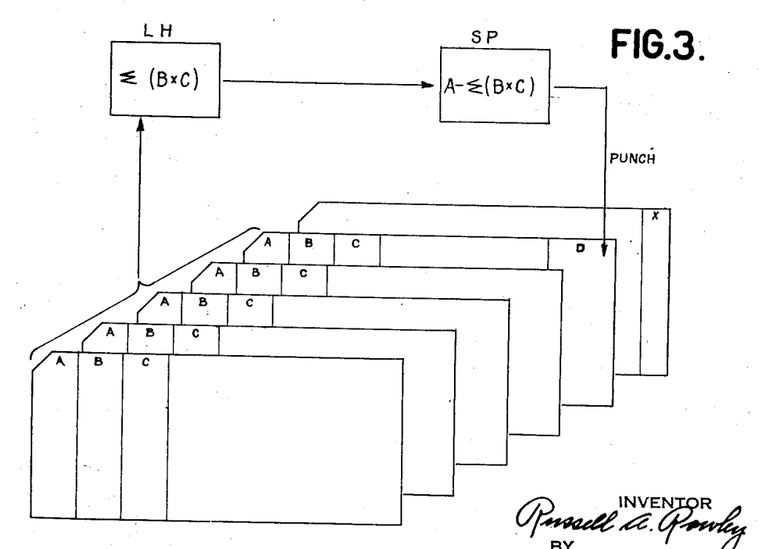
Fig. 3 is a diagrammatic representation of the problem which the mechanism is designed to perform.
Figure 4:
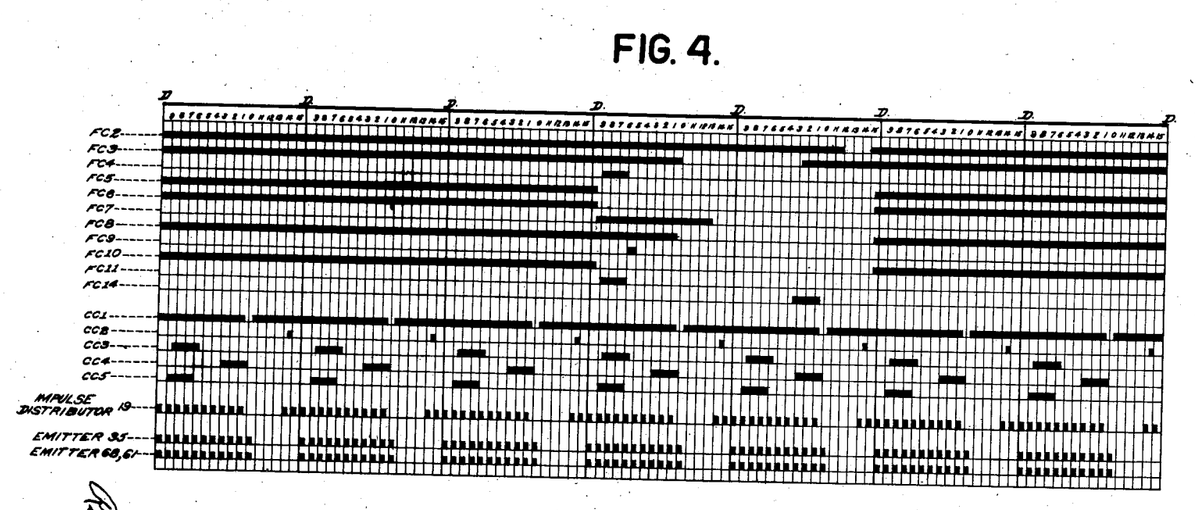
Fig. 4 is a timing diagram of the cam controlled contact devices in the machine.

The manner in which the standard multiplying punch has been modified to handle the problem illustrated in Fig. 3 will now be set forth. This problem consists in deriving the factors B and C from all but the last or control card of a group and separately computing the individual products. In the operation, the LH accumulator is not reset so that it will contain the sum of the several individual products. The A amount is contained in each card except the last and is entered into the SP accumulator for each card. The A amounts of all but the last card containing an A amount are not used as the SP accumulator is cleared after each multiplying operation, so that the entry of such A amounts prior to the last is an idle operation and if desired only the last such card may be punched with the A amount. After all the individual products are summarized in the 64 accumulator the "X" field of the last card causes the sum of the products to be subtracted from the amount in the SP accumulator and the result D is punched in the next to the last card. The accumulators are then reset and the same operations are repeated for the next group of cards.

As a preliminary, switch SW2 (Fig. 1a) is opened to break the reset circuit of magnet 37LH. Switch 66 (Fig. 1c) is closed and relay magnet SM becomes energized thereby, to shift the various contacts prefixed SM. With a group of cards, such as indicated in Fig. 3, in the hopper the start key is pressed to close contacts 13 and as before relay magnet C is energized to cause two card feeding cycles of operations resulting in the closure of the circuit to relay magnet H and the consequent supply of current to the analyzing brushes 17 (Fig. 1a). The factors B and C are entered from the first card into the MP and MC accumulators and multiplying operations automatically ensue in the same manner as explained in connection with the standard operation of the machine.

The M and N relays are initially energized through a different circuit than when normal multiplying is performed. The circuit is completed during the initial card feeding cycles by closure of cam contacts FC14 and is traceable from line 11 (Fig. 1c), card lever contacts 18, wire 67, contacts FC14, now closed contacts SM2, wire 28 to relay magnets M and N and to other side of line as before.

Upon completion of the multiplying, the RH partial products are transferred to the LH accumulator and the MC, MP and RH accumulators are reset as before. The resetting of the MC accumulator by closing lower contacts 31 again energizes relay D to close contacts D1 (Fig. 1b) which supply current to the transfer emitters. With contacts SM8 shifted, however, the inverting emitter 68 becomes active to transfer the complement of the amount standing on the LH accumulator to the SP accumulator, through connections 62.

Since contacts SM1 are now open due to energization of magnet SM, closure of contacts 40 due to the MC reset will not energize relay magnet C as for normal multiplying operations. The magnet C is energized upon reset of the SP accumulator which takes place when the amount in the LH accumulator has been transferred to the SP accumulator. Initiation of the SP reset operation is brought about through the circuit traceable (Fig. 1a) from line 12, contacts CC2, K2, L2, upper contacts SM6 (now closed) and reset magnet 37SP to ground. The consequent closure of the SP reset contacts completes a circuit traceable (Fig. 1c) from line 11, upper contacts 43, switch SW2 (in dotted position), lower contacts 43a, left hand contact SM1, magnet C to line 10.

This complementary transfer takes place due to the arrangement of the machine but since the SP accumulator is reset following each such entry the transfer has no effect. Referring now to Fig. 1c, the usual "elusive one" entry magnet 71 associated with the SP accumulator is energized for each transfer operation through a circuit traceable from line 11, card lever contacts 18, now closed contacts SM5, contacts FC4, upper contacts SM4, magnet 71 to line 10. The reset magnet 37SP is shown in Fig. 1a and is energized for each card through the circuit from line 12, contacts CC2, K2, L2, upper contacts SM6, magnet 37SP to ground.

The punching period which commences after the transfer of LH to SP is rendered ineffective for all detail cards as follows:

With contacts SM10 shifted, magnet E is energized through a circuit from line 11, contacts FC5, contacts S1, SM10, relay magnet E to line 10. Energization of magnet E, as explained, prevents the completion of punch selecting circuits and causes the passing of the card without punching therein. In Fig. 1a, switch SW2 is open for this operation, thereby preventing resetting of the LH accumulator.

Briefly recapitulating, for each card bearing the two factors B and C, the machine goes through a succession of cycles of operation, during which the factors are entered into the MC and MP accumulators, multiplied together and the product obtained in the LH accumulator.

The amount in the LH accumulator is then transferred to the SP accumulator as a complement and the SP accumulator is reset. The product in the LH accumulator is retained and increased by the product of the factors derived from the succeeding card and the several cards except the last are passed to the discharge hopper without being punched.

Just after the next to the last card of the group passes the analyzing brushes 17, the last card reaches the brushes so that it is sensed for the "X" perforation by brush 63 and a circuit is completed from line 11 (Fig. 1c), contacts FC5, brush 63, contacts H2, right hand contacts SM11 (now closed), relay magnet S, to line 10.

The initial energization of relay magnet C has also caused energization of magnet CA in parallel therewith through closed contacts SM9 and N2 and this magnet will have shifted its contacts CA1 shown in Fig. 1b. The sockets 69 are plug-connected to the brushes 17 traversing the A field of the cards so that as the card proceeds past these brushes, the A amount will be entered into the SP accumulator through the right hand contacts CA1. As explained hereinabove, the SP accumulator is reset for each detail card so that after the last detail card has been sensed and after the B and C factors thereof have been multiplied, the SP accumulator will contain the A amount and the LH accumulator will contain the sum of the B×C products. Since this card also contains the B and C factors to be multiplied entries are made in the MC and MP accumulators and the machine proceeds to obtain the product B×C as before and to transfer the amount standing on the LH accumulator to the SP accumulator in the form of a complement. The amount standing in the SP accumulator is now the "new balance" and this is to be punched in the card.

Relay magnet S by shifting its contacts S1 (Fig. 1c) prevents energization of relay E and the contacts E1 consequently remain in the position shown so that the punch selecting circuits are no longer disrupted. Closure of contacts S2 (Fig. 1a) causes energization of LH reset magnet 37LH after punching has taken place so that both the SP and LH accumulators are cleared and the machine is ready to proceed with the next group of cards.

A relay Q is provided to delay the operation of punching until the LH to SP transfer has been completed. During such transfer contacts D3 (Fig. 1c) are closed and a circuit is completed from line 11, contacts D3, CC4, SM3, relay Q, to line 10. Cam contacts CC4 close toward the end of the cycle after contacts CC5 have opened and it is only on the next following cycle that relay B can be energized through a circuit traceable from line 10, relay B, contacts CC5, contacts Q1, closed contacts 44 and 43, to line 11.

Provision is made for effecting a punching of a special designation in the "X" index point position of a selected column of the balance card to denote a "new balance card". If the column is other than one of these which receives the new balance, a plug connection 72 (Fig. 1b) is made so that when the selected column is in punching position, a circuit will be completed from wire 47, common 48, segment 49, connection 72, relay R to line 10 through wire 29. Relay R closes its contacts R2 and the circuit branches through the "X" selecting magnet 53 to cause punching in such position. If the "X" is to be punched in one of the "new balance" columns, a connection 73 is made to the corresponding column of the SP accumulator and parallel circuits will be completed by relay contacts R1 and R2 to energize the "X" magnet 53 and the digit magnet 53 corresponding to the value of the setting of the selected accumulator order.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. The invention set forth in claim 2 in which normally inoperative resetting means is provided for said result receiving means and further means is provided and controlled by said further analyzing means in response to the analysis of said control card for rendering said resetting means operative to reset said result receiving means.

2. In a multiplying machine, means for successively analyzing each of a group of cards including a plurality of record cards followed by a control card, multiplier and multiplicand receiving devices controlled by said analyzing means to receive factors from said record cords, multiplying means including a result receiving means controlled by said devices to compute the products of said factors, an accumulator, and transfer mechanism controlled by said result-receiving means for causing said accumulator to receive said products, punch controlling means arranged to be controlled by said accumulator in accordance with the amount therein, means normally preventing operation of said punch controlling means, further analyzing means operative to analyze said control card before it is analyzed by the first named analyzing means and means controlled by said further analyzing means in response to the analysis of said control card for disabling said preventing means before said control card is analyzed by said first named analyzing means whereby said punch controlling means will be controlled by said accumulator.

3. In a multiplying machine, means for successively analyzing each of a group of cards including a plurality of record cards followed by a control card, each record card having factor representing designations, the record card preceding the control card having a further amount designation and the control card having a special designation thereon, factor receiving devices controlled by said analyzing means to receive the factors from said record cards, multiplying means including a result receiving accumulator controlled by said devices to compute the products of said factors, resetting means for said devices, effective to reset the same after multiplication of each pair of factors, normally ineffective resetting means for said accumulator, whereby the accumulator will contain a progressive sum of the products of the factors obtained from the series of record cards, a second accumulator, transfer mechanism controlled by said first accumulator for transferring the amount therein to the second accumulator in the form of a complement, said mechanism being effective after the factors of each record card are multiplied, means effective after each transfer operation for resetting said second accumulator, means controlled by said analyzing means for entering the further amount on the last record card into said second accumulator concurrently with the entry of the related factors into the factor receiving devices, whereby upon completion of the multiplying operation the sum of the products of all the record cards will be transferred in the form of complement to the second accumulator, punch controlling means arranged to be controlled by said second accumulator in accordance with the amount therein after each transfer operation, means normally preventing operation of said punch controlling means, further analyzing means operative to analyze said control card before it is analyzed by the first named analyzing means, means controlling said further analyzing means in response to the analysis of said control card for disabling said preventing means before said control card is analyzed by said first named analyzing means whereby said punch controlling means will be controlled by said second accumulator and means controlled by said further analyzing means for rendering the resetting means of the first accumulator effective to reset the same.

RUSSELL A. ROWLEY.